Sept. 28, 1965    C. R. JAGEMAN    3,208,757

JOINT FOR PLASTIC PIPE

Filed Oct. 23, 1963

INVENTOR.
CHARLES R. JAGEMAN
BY
Charles L. Lovercheck
attorney

United States Patent Office 3,208,757
Patented Sept. 28, 1965

3,208,757
JOINT FOR PLASTIC PIPE
Charles R. Jageman, Erie, Pa., assignor to Pyramid Industries, Inc., Erie, Pa., a corporation of Pennsylvania
Filed Oct. 23, 1963, Ser. No. 318,457
4 Claims. (Cl. 277—168)

This application is a continuation in part of patent application, Serial No. 853,384, filed November 16, 1959, now abandoned.

This invention relates to the joining and sealing of ducts and, more particularly, to joining pipe made of deformable material such as polyethylene.

Pipes of the type disclosed herein are often used as soil pipes. The pipe may be constructed of a plastic material, the resilient qualities of which are necessary to the successful sealing which is accomplished by this invention. This invention constitutes an improved method for the joining of pipe.

It is, accordingly, an object of the present invention to provide a durable, leakproof coupling which can be economically produced and sold at a reasonable price.

Another object of the invention is to provide an improved coupling.

A further object of the invention is to provide a coupling of simple construction which can be easily installed without the use of special tools and which is, therefore, convenient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
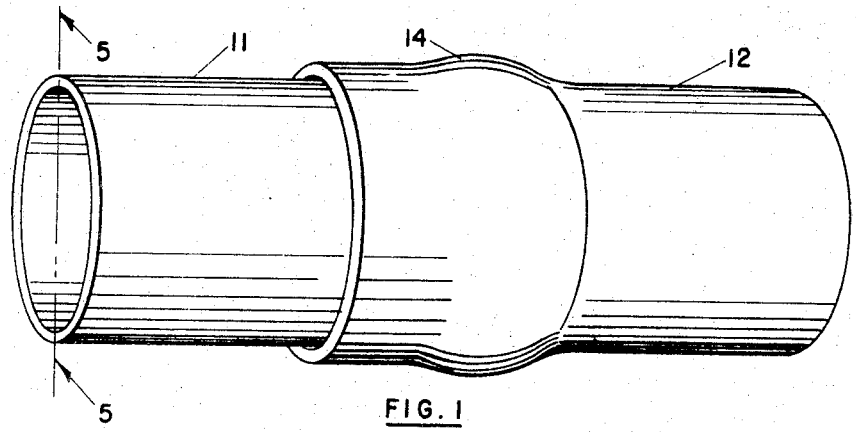
FIG. 1 is an isometric view of a pipe joint according to the invention.
Figure 2:
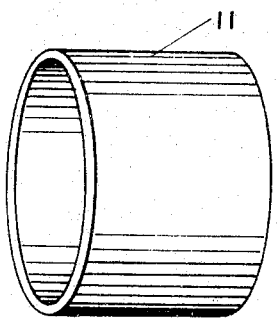
FIG. 2 is an isometric view of the spigot end of the pipe in an unassembled position.
Figure 3:
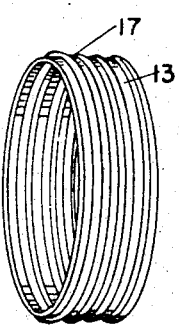
FIG. 3 is an isometric view of the ring shown in an unassembled position.
Figure 4:
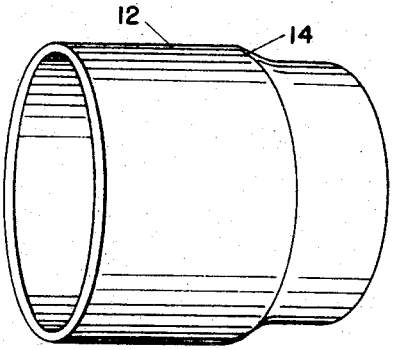
FIG. 4 is an isometric view of the bell end of the pipe.

Referring now more particularly to the drawing, a pipe joint is shown comprised of a spigot end 11, a bell end 12, and a ring 13. The ring 13 has an inwardly directed flange on the end which overlies and rests against the end of the pipe and prevents the ring 13 from creeping up the side of the pipe as it is indexed into the bell end 12. The ring 13 has an outwardly directed flange 18 around the end which deforms the plastic and embeds itself therein.

The ring 13 may have a thickness of approximately .035 inch and be approximately one-half inch wide. Ribs 16 and 17 may be approximately .015 inch high. A flange 15 may be substantially higher and may be as high as the wall thickness of the spigot end 11 and its rests against the outer end of the bell end 12. The flange 18 may be approximately the same height as the flange 15 and it rests against the inner end of the spigot end 11. The flanges 15 and 18 limit the relative movement of the bell end and spigot end.

The internal peripheral ribs 16 deform the spigot end 11 and thus embed themselves therein to form a seal between the spigot end 11 and bell end 12. The construction of the ring 13 facilitates easier indexing of the spigot end 11 into the bell end 12. The bell and spigot ends will be in the range of thickness of, for example, .100 inch wall to .350 inch for the ordinary pipe sizes of two inches to eight inches in diameter.

The ring 13 is placed over the spigot end 11 of the pipe and indexed into the bell end 12 of the pipe. A flat striking surface is then placed over the second end of the pipe and stuck with a hammer to drive the joint home so that the flanges 15 and 18 rest against the ends of the spigot end 11 and the bell end 12.

Fittings may also be made having a bell end 12 and a spigot end 11 and employ a ring like the ring 13. These fittings may be ties, elbows Y's etc. They may be assembled in an identical manner as the joint described above.

The ring 13 in the preferred embodiment is approximately the same inside diameter as the outside diameter of the spigot end 11. It may be made of low density polyethylene having a density of approximately .920 to .930 gram per cubic centimeter. The ring can also be made of butyl rubber.

The bell end 12 may have approximately the same inside diameter as the outside diameter of the spigot end 11. The bell end may have an inside diameter in some cases slightly less than the outside diameter of the spigot end 11 so that it forms a tight fit thereon and the O-ring distorts the material of the bell and spigot. In pipe of four inch diameter or greater, it has been found desirable to machine a groove in the bell end or spigot end. The groove will have a depth one-fourth the thickness of the O-ring. This will positively locate the O-ring.

The bell end 12 and spigot end 11 may both be of high density polyethylene having a density of approximately .94 to .96 gram per cubic centimeter. The spigot end and bell end may be of a size range from two to eight inches.

Figure 7:
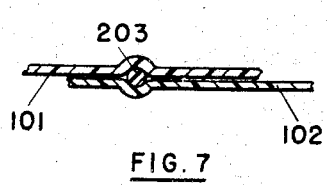
FIG. 7 is a cross sectional view of another embodiment of the invention.
Figure 5:
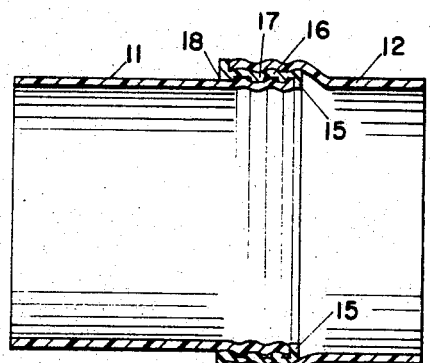
FIG. 5 is a cross sectional view of the pipe joint taken on line 5—5 of FIG. 1.
Figure 6:
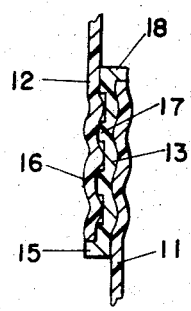
FIG. 6 is an enlarged cross sectional view of the ring.

The embodiment of the invention shown in FIG. 7 discloses a simple O-shaped ring 203 between a bell and spigot telescoping joint between ducts 101 and 102. The ring 203 may have a thickness of approximately three-sixteenth inch and it may be made of butyl rubber.

From the foregoing, it will be seen that the invention consists of a joint made up of two pipes, one having a bell end and the other a spigot end. The bell end is formed by subjecting one end of a pipe made of a resilient material to an upsetting action. A spigot end of another pipe having a ring is inserted in the bell end of the pipe. The ring has a simple overlapping locking device. The distorting effect of the ring in conjunction with the resilient qualities of the plastic material used in the pipe results in the ring deforming the plastic and thus embedding itself in the plastic. This forms a durable, easily assembled, leakproof joint. The joint will not allow roots of trees and plants to enter it when used as a soil pipe.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tubular duct formed of thermoplastic material which is generally rigid comprising
    a plurality of tubular sections joined end to end by telescoping bell and spigot joints,
    the bell end of each section having an inside diameter slightly greater than the outside diameter of said spigot end of an adjoining section and receiving said spigot end,
    and a ring having a thickness of approximately .035 inch and made of a material having the property of a material taken from the group consisting of low density polyethylene and butyl rubber, said ring being disposed around and embedded in said spigot end and received by and embedded in said bell end and having a thickness greater than the clearance between said bell and said spigot ends, said ring being made of harder material than said bell and spigot ends whereby said ring is adapted to deform the material of both said bell and said spigot end to form a seal therebetween, said ring being generally cylindrical and having a plurality of axially spaced, circumferential ribs on the outer periphery thereof and on the inner periphery thereof.

2. A tubular duct formed of thermoplastic material which is generally rigid comprising a plurality of tubular sections joined end to end by telescoping bell and spigot joints, the bell end of each section having an inside diameter slightly greater than the outside diameter of said spigot end of an adjoining section and receiving said spigot end, a ring having a thickness of approximately .035 inch and made of a material having the property of a material taken from the group consisting of low density polyethylene and butyl rubber, said ring being disposed around and embedded in said spigot end and received by and embedded in said bell end and having a thickness greater than the clearance between said bell and said spigot ends, said ring being made of harder material than said bell and spigot ends whereby said ring is adapted to deform the material of both said bell and said spigot ends to form a seal therebetween, said ring being generally cylindrical and having a plurality of axially spaced, circumferential ribs on the outer periphery thereof and on the inner periphery thereof, and a circumferential flange on one end of said ring engaging the spigot end of one said section.

3. A tubular duct formed of thermoplastic material which is generally rigid comprising a plurality of tubular sections joined end to end by telescoping bell and spigot joints, the bell end of each section having an inside diameter slightly greater than the outside diameter of said spigot end of an adjoining section and receiving said spigot end, a ring having a thickness of approximately .035 inch and made of a material having the property of a material taken from the group consisting of low density polyethylene and butyl rubber, said ring being disposed around and embedded in said spigot end and received by and embedded in said bell end and having a thickness greater than the clearance between said bell and said spigot ends, said ring being made of harder material than said bell and spigot ends whereby said ring is adapted to deform the material of both said bell and said spigot ends to form a seal therebetween, said ring being generally cylindrical and having a plurality of axially spaced, circumferential ribs on the outer periphery thereof and on the inner periphery thereof, and a circumferential flange on the outer periphery of said ring extending outwardly a substantially greater distance than said ribs, engaging the end of said bell.

4. A tubular duct formed of thermoplastic material which is generally rigid comprising a plurality of tubular sections joined end to end by telescoping bell and spigot joints, the bell end of each section having an inside diameter slightly greater than the outside diameter of said spigot end of an adjoining section and receiving said spigot end, a ring having a thickness of approximately .035 inch and made of a material having the property of a material taken from the group consisting of low density polyethylene and butyl rubber, said ring being disposed around and embedded in said spigot end and received by and embedded in said bell end and having a thickness greater than the clearance between said bell and said spigot ends, said ring being made of harder material than said bell and spigot ends whereby said ring is adapted to deform the material of both said bell and said spigot ends to form a seal therebetween, said ring being generally cylindrical and having a plurality of axially spaced, circumferential ribs on the outer periphery thereof and on the inner periphery thereof, said ribs being approximately .015 inch high, a circumferential flange on one end of said ring and engaging the spigot end of one said section, and a circumferential flange on the outer periphery of said ring extending outwardly a substantially greater distance than said ribs and engaging an end of said bell end.

References Cited by the Examiner

UNITED STATES PATENTS

| 360,663 | 4/87 | Daniels | 220—55 |
| 2,613,959 | 10/52 | Richardson | 285—382.2 |
| 3,013,820 | 12/61 | Pouppirt | 285—423 XR |

FOREIGN PATENTS

| 214,487 | 4/58 | Australia. |
| 61,978 | 1/40 | Norway. |

LEWIS J. LENNY, *Primary Examiner.*

SAMUEL ROTHBERG, *Examiner.*